United States Patent
Vakoc et al.

(10) Patent No.: US 12,474,157 B2
(45) Date of Patent: Nov. 18, 2025

(54) FREQUENCY-COMB GENERATION BASED ON ELECTRO-OPTIC PHASE-CODE MODE-LOCKING FOR CIRCULAR-RANGING OCT

(71) Applicant: The General Hospital Corporation, Boston, MA (US)

(72) Inventors: Benjamin Vakoc, Arlington, MA (US); Tae Shik Kim, Boston, MA (US)

(73) Assignee: The General Hospital Corporation, Boston, MA (US)

( * ) Notice: Subject to any disclaimer, the term of this patent is extended or adjusted under 35 U.S.C. 154(b) by 769 days.

(21) Appl. No.: 17/759,735

(22) PCT Filed: Jan. 29, 2021

(86) PCT No.: PCT/US2021/015753
§ 371 (c)(1),
(2) Date: Jul. 29, 2022

(87) PCT Pub. No.: WO2021/194630
PCT Pub. Date: Sep. 30, 2021

(65) Prior Publication Data
US 2023/0332879 A1   Oct. 19, 2023

Related U.S. Application Data

(60) Provisional application No. 62/968,299, filed on Jan. 31, 2020.

(51) Int. Cl.
*H01S 3/08*   (2023.01)
*G01B 9/02001*   (2022.01)
(Continued)

(52) U.S. Cl.
CPC ......... *G01B 9/02008* (2013.01); *G02F 1/213* (2021.01); *H01S 3/083* (2013.01); *H01S 3/107* (2013.01); *G02F 2203/50* (2013.01)

(58) Field of Classification Search
CPC .. H01S 3/083; H01S 3/08027; H01S 3/08013; H01S 3/107; H01S 3/1109;
(Continued)

(56) References Cited

U.S. PATENT DOCUMENTS

| 6,590,910 B2 | 7/2003 | Lin |
| 9,668,652 B2 * | 6/2017 | Vakoc ............... G01B 9/02007 |

(Continued)

FOREIGN PATENT DOCUMENTS

| JP | 2007151383 A | 6/2007 |
| JP | 2009031238 A | 2/2009 |

(Continued)

OTHER PUBLICATIONS

Zhang, P. et al., Aperture Phase Modulation with Adaptive Optics: A Novel Approach for Speckle Reduction and Structure Extraction in Optical Coherence Tomography, Biomedical Optics Express, 2019, 10(2):552-570.

(Continued)

*Primary Examiner* — Tod T Van Roy
*Assistant Examiner* — Delma R Forde
(74) *Attorney, Agent, or Firm* — QUARLES & BRADY LLP

(57) ABSTRACT

A source for providing electromagnetic radiation within a particular spectral range, including: a ring-shaped optical resonator for circulating a plurality of wavelength bands including: a first optical phase modulator, a first chomatic dispersion device, a second optical phase modulator, a multi-line spectral domain filter, a second chromatic dispersion device, and an optical amplifier; a controller coupled to the first optical phase modulator and the second optical phase modulator which is configured to drive the first optical phase modulator with a first waveform and the second optical phase modulator with a second waveform, the first (Continued)

chromatic dispersion device being configured between the first optical phase modulator and the second optical phase modulator to provide chromatic dispersion so as to subject each of the plurality of wavelength bands to a respective plurality of different time delays, the first and second optical phase modulators being configured to create spectral broadening.

38 Claims, 13 Drawing Sheets

(51) Int. Cl.
*G01B 9/02091* (2022.01)
*G02F 1/21* (2006.01)
*H01S 3/083* (2006.01)
*H01S 3/107* (2006.01)

(58) Field of Classification Search
CPC . G01B 9/02008; G01B 9/02091; G02F 1/213; G02F 1/39; G02F 2203/50; G02F 2203/54; G02F 2203/56
See application file for complete search history.

(56) References Cited

U.S. PATENT DOCUMENTS

| 10,966,613 | B2* | 4/2021 | Vakoc | G01B 9/02005 |
|---|---|---|---|---|
| 2011/0155916 | A1 | 6/2011 | Furusawa et al. | |
| 2011/0170110 | A1 | 7/2011 | Oigawa et al. | |
| 2012/0162662 | A1 | 6/2012 | Johnson et al. | |
| 2012/0294319 | A1 | 11/2012 | Maleki et al. | |
| 2016/0363435 | A1 | 12/2016 | Everett et al. | |
| 2017/0299697 | A1 | 10/2017 | Swanson | |
| 2018/0307118 | A1 | 10/2018 | Sciancalepore et al. | |
| 2019/0006812 | A1 | 1/2019 | Langseth et al. | |
| 2019/0049232 | A1 | 2/2019 | Vakoc et al. | |
| 2019/0082962 | A1 | 3/2019 | Vakoc et al. | |
| 2019/0317379 | A1 | 10/2019 | Herr et al. | |
| 2019/0368859 | A1 | 12/2019 | Swanson et al. | |

FOREIGN PATENT DOCUMENTS

| JP | 2012080013 A | 4/2012 |
|---|---|---|
| JP | 2014501393 A | 1/2014 |
| JP | 5495506 B | 5/2014 |
| JP | 2014517344 A | 7/2014 |
| WO | 2004107033 A1 | 12/2004 |
| WO | 2009139481 A1 | 11/2009 |
| WO | 2012018195 A2 | 2/2012 |
| WO | 2019213137 A1 | 11/2019 |

OTHER PUBLICATIONS

European Patent Office, Extended Search Report, Application No. 21776191.5, Jan. 19, 2024, 14 pages.
Klein et al., High-Speed OCT Light Sources and Systems [Invited], Biomedical Optics Express, 2017, 8(2):828-859.
Siddiqui et al., Compensation of Spectral and RF Errors in Swept-Source OCT for High Extinction Complex Demodulation, Optics Express, 2015, 23(5):5508-5520.
Siddiqui et al., High-Speed Optical Coherence Tomography by Circular Interferometric Ranging, Nature Photonics, 2018, 12:111-116.
European Patent Office, Extended Search Report, Application No. 22191202.5, Nov. 16, 2022, 12 pages.
PCT International Search Report and Written Opinion, PCT/US2021/015753, Jan. 27, 2022, 9 pages.

* cited by examiner

FREQUENCY-COMB GENERATION BASED ON ELECTRO-OPTIC PHASE-CODE MODE-LOCKING FOR CIRCULAR-RANGING OCT

CROSS REFERENCE TO RELATED APPLICATIONS

The present application is a U.S. National Phase of International Application PCT/US2021/015753 filed Jan. 29, 2021, which relates to and claims priority from U.S. Patent Application Ser. No. 62/968,299, filed on Jan. 31, 2020. Each of the preceding patent applications are incorporated herein by reference in their entireties.

STATEMENT REGARDING FEDERALLY SPONSORED RESEARCH

This invention was made with government support under grant number P41EB015903 awarded by the National Institutes of Health and grant number FA9550-11-1-0331 awarded by the Air Force Office of Scientific Research. The government has certain rights in the invention.

BACKGROUND

Optical coherence tomography (OCT) is widely used for imaging three-dimensional structures of biological tissues and materials. The defining property of the OCT technique is the use of echo-delay ranging to resolve the depth position of scatterers. In recently described circular-ranging (CR) OCT methods, a compressive echo-delay ranging approach is leveraged to reduce the number of measurements that are required for capturing signals with sparsity in the depth-domain. This sparsity is common in OCT, especially long-range OCT applications. By reducing measurement count, the electronic signal capture and processing bandwidths are lowered, leading to higher-speed imaging for a given electronic bandwidth or a simplified signal capture system for moderate speed imaging. For imaging at the highest possible speeds, stretched-pulse mode-locked (SPML) lasers provide the stepped frequency comb output used by CR-OCT with repetition rates of several to tens of megahertz. These SPML sources do not easily scale to slower speeds, and thus do not provide solutions for moderate-speed CR-OCT. Instead, there is a need for a different source technology to enable moderate-speed CR-OCT.

SUMMARY OF THE INVENTION

Accordingly, new systems, methods, and apparatus for providing a source for circular-ranging OCT are desirable.

In one embodiment, the invention provides a source for providing electromagnetic radiation within a particular spectral range, including: a ring-shaped optical resonator for circulating a plurality of wavelength bands including: a first optical phase modulator, a first chromatic dispersion device, a second optical phase modulator, a multi-line spectral domain filter, a second chromatic dispersion device, and an optical amplifier; a controller coupled to the first optical phase modulator and the second optical phase modulator which is configured to drive the first optical phase modulator with a first waveform and the second optical phase modulator with a second waveform, the first chromatic dispersion device being configured between the first optical phase modulator and the second optical phase modulator to provide chromatic dispersion so as to subject each of the plurality of wavelength bands to a respective plurality of different time delays, the first optical phase modulator and the second optical phase modulator being configured to create spectral broadening by the first optical phase modulator of each of the plurality of wavelength bands and spectral recovery by the second optical phase modulator of a particular wavelength band of the plurality of wavelength bands by modulating a first phase using the first optical phase modulator driven by the first waveform and, after a particular time delay, modulating a second phase using the second optical phase modulator driven by the second waveform comprising an inverse of the first waveform, the particular time delay being determined so as to create spectral recovery for the particular wavelength band of the plurality of wavelength bands, the multi-line spectral domain filter being configured to provide multi-line spectral filtering with narrow bandwidths in order to induce power loss for each of the plurality of wavelength bands except for the particular wavelength band, the second chromatic dispersion device being configured to provide chromatic dispersion compensation to an output of the multi-line spectral domain filter in order to compensate a group delay dispersion within the optical resonator and match a roundtrip frequency for each of the plurality of wavelength bands, and the first and second waveforms being configured to create a periodic phase modulation for recovery of the plurality of wavelength bands at a frequency that is an integer multiple of a roundtrip frequency of the optical resonator.

In another embodiment, the invention provides a source for providing electromagnetic radiation within a particular spectral range, including: a ring-shaped optical resonator for circulating a plurality of wavelength bands including: a first optical phase modulator, a chromatic dispersion device, a second optical phase modulator, a multi-line spectral domain filter, and an optical amplifier; a controller coupled to the first optical phase modulator and the second optical phase modulator which is configured to drive the first optical phase modulator with a first waveform and the second optical phase modulator with a second waveform, the chromatic dispersion device being configured between the first optical phase modulator and the second optical phase modulator to provide chromatic dispersion so as to subject each of the plurality of wavelength bands to a respective plurality of different time delays, the first optical phase modulator and the second optical phase modulator being configured to create spectral broadening by the first optical phase modulator of each of the plurality of wavelength bands and spectral recovery by the second optical phase modulator of a particular wavelength band of the plurality of wavelength bands by modulating a first phase using the first optical phase modulator driven by the first waveform and, after a particular time delay, modulating a second phase using the second optical phase modulator driven by the second waveform comprising an inverse of the first waveform, the particular time delay being determined so as to create spectral recovery for the particular wavelength band of the plurality of wavelength bands, the multi-line spectral domain filter being configured to provide multi-line spectral filtering with narrow bandwidths in order to induce power loss for each of the plurality of wavelength bands except for the particular wavelength band, the first and second waveforms being configured to create a recovery that has a sufficiently long duration so that each of the plurality of wavelength bands experiences multiple roundtrips within the optical resonator, and the first and second waveforms being configured to create a periodic phase modulation for recovery of the plurality of wavelength bands at a frequency that is an integer multiple of a roundtrip frequency of the optical resonator.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
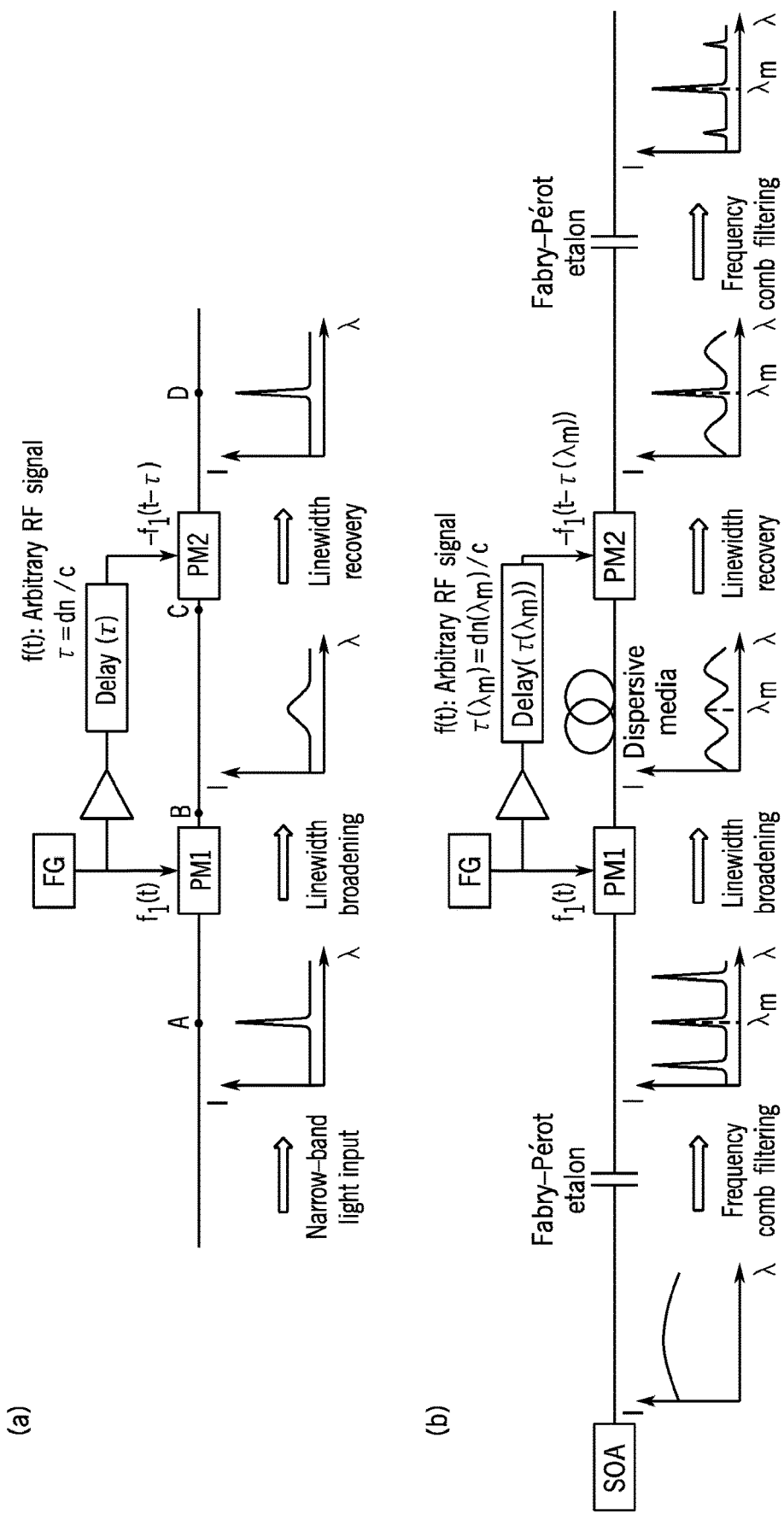
FIG. 1 shows a diagram depicting the operating principle of phase code wavelength filter. Panel (a) shows linewidth broadening and recovery of narrow-band light by phase modulation and compensation. Panel (b) shows wavelength filtering using selective linewidth recovery of a frequency comb and Fabry-Pérot etalon by using dispersion between two phase modulators. PM, phase modulator; FG, function generator; SOA, semiconductor optical amplifier.

In accordance with some embodiments of the disclosed subject matter, mechanisms (which can include systems, methods, and apparatus) for providing a source for circular-ranging OCT, particularly at moderate speeds, are provided.

Circular-ranging (CR) optical coherence tomography (OCT) uses frequency comb sources to improve long-range imaging. While the initial development of CR-OCT focused on extremely high-speed imaging (i.e., operation at A-line rates of several to tens of MHz), there are many applications and imaging strategies for which more moderate speeds are preferred. However, there is a lack of suitable frequency comb sources to enable moderate speed CR-OCT imaging. Described herein are embodiments of a novel phase-code mode-locking (PCML) laser architecture that can be operated from the kilohertz to megahertz range, while also offering novel features such as dynamic re-configurability and simplified linear-in-time frequency stepping. A prototype CR-OCT system with a PCML laser is demonstrated and imaging results are presented at A-line rates from 176 kHz to 3.52 MHz with coherence-length limited imaging depths as high as 170 mm. In various embodiments of the disclosed apparatus, A-line rates ranging from 100 kHz to 5 MHz may be achieved. In further various embodiments of the disclosed apparatus, sequences of optical pulses at optical frequency comb lines with each pulse having a pulsewidths from 1 ns to 100 ns can be achieved.

Optical coherence tomography (OCT) is a widely used three-dimensional imaging modality defined by its use of echo-delay depth ranging. In recently described circular-ranging (CR) OCT methods, stepped-in-time frequency comb sources were used to enable compressive echo-delay ranging. With compressive ranging, fewer measurements are required to interrogate long depth ranges. This reduces the bandwidth requirements of the electronics used to capture and process the output signals. Using high-speed stepped frequency comb sources based on stretched-pulse mode-locking (SPML), CR-OCT was demonstrated at speeds in excess of 10 MHz.

The compression provided by CR can also be used to reduce electronic bandwidth requirements in more moderate speed, long-range imaging applications. Unfortunately, the SPML laser is poorly suited to moderate speed imaging; prohibitively long chirped fiber Bragg gratings would be required to reduce speeds below several megahertz. Moderate speed CR-OCT has instead relied on sources created by modifying existing swept-source laser architectures. Fixed Fabry-Pérot etalons have been added to polygon-mirror and micro-mechanical Fabry-Pérot swept-wavelength lasers. While this yields the required stepped frequency comb output, the noise and coherence length properties have been relatively poor and the nonlinear-in-time output pulse sequence complicates signal capture.

Accordingly, disclosed herein are embodiments of a novel stepped frequency comb laser architecture for use in CR-OCT. This laser architecture is termed phase-code mode-locking (PCML). Like the SPML laser, the PCML laser uses intracavity dispersion and electro-optic modulation instead of mechanically-tuned spectral filters. A difference between SPML and PCML architectures is that the SPML architecture uses electro-optic amplitude modulation, while the PCML architecture uses electro-optic phase modulation. This distinction, along with the use of suitably-designed control signals, allows the laser repetition rate to be decoupled from the intracavity dispersion. As a result, embodiments of the PCML laser disclosed herein are able to operate at moderate speeds using reasonable levels of intracavity dispersion. Moreover, a PCML source can be operated over a wide-range of speeds without hardware modification, and a nearly arbitrary combline sequence (i.e., order of output wavelengths in time) can be generated.

The PCML laser leverages reversible electro-optic linewidth broadening to create a frequency combline transmission filter. This principle is relatively straightforward and is illustrated in FIG. 1. As a starting point, the evolution of a narrowband, CW input field is first analyzed at optical frequency ω and described by $E_A(t)=\cos(\omega t)$ that passes through two sequential phase modulators (FIG. 1(a)). Light is launched at point A. The first modulator is driven by a voltage drive signal $f_1(t)$, resulting in an output field given by $E_B(t)=\cos(\omega t)+\alpha f_1(t))$ where α is the modulator's scale-factor between induced phase shift and drive voltage (rad/V). For simplicity, it is assumed that α_0 is a constant across RF frequency and optical frequency.

This phase modulation broadens the linewidth of the light at point B, as illustrated in FIG. 1(a). The spectrally-broadened light travels to the second phase modulator located a distance d (in fiber, point C) from the first modulator. The field at this point is given by $E_C(t)=\cos(\omega(t-dn/c)+\alpha f_1(t-dn/c))$ where n is the group index of the fiber and c is the speed of light. At the second phase modulator output (point D), the field has been further modulated as $E_D(t)=\cos(\omega(t-dn/c)+\alpha f_1(t-dn/c))+f_2(t))$. It is easy to appreciate that, if the drive signals are configured such that $f_2(t)=-f_1(t-dn/c)$, then the two modulations cancel and the original narrowband linewidth is recovered, $E_D(t)=\cos(\omega t)$. Note that this reversible linewidth broadening occurs only when the delay of the signal $f_2$ relative to $f_1$ matches the optical group delay between the modulators.

In FIG. 1(b), a combline transmission filter is constructed based on this principle of reversible linewidth broadening. Here, identical Fabry-Pérot etalons are added before and after the phase modulators and dispersive fiber is added between the modulators. If broadband (e.g., amplified spontaneous emission (ASE)) light is launched, a frequency comb will be generated by the first etalon. Each line of this frequency comb will be equivalently broadened by the first phase modulator. Now, because of the dispersive fiber, each of the optical comblines experiences a different group delay in transit to the second modulator. The second modulator drive signal $f_2$ can be delayed such that it reverses the linewidth broadening for only one of the comblines $(f_2(t)=-f_1(t-dn(\lambda_m)/c))$. The output Fabry-Pérot etalon (identical to the first) then attenuates the optical power of the broadened comblines, while efficiently transmitting the single, narrow combline. By controlling the drive signal provided to the second modulator, any of the comblines can be selected for high transmission. Extending on this concept, a dynamic sequence of combline transmissions can be generated by applying an appropriately constructed drive signal to the second phase modulator. This dynamic combline transmission filter can then be used to create a stepped frequency comb laser.

Laser Architecture

To construct a laser, the electronically controlled phase-code filter of FIG. 1 was placed within a ring cavity (FIG. 2(a)). In this cavity, light travels from the output of the filter to the input of the filter without experiencing significant phase/spectral modulation. As a result, the two Fabry-Pérot etalons used in the filter (FIG. 1(b)) are redundant, and can be replaced by a single etalon. A fixed 80 GHz free spectral range (FSR) Fabry-Pérot etalon (Light Machinery) with a Finesse of 100 was used. The phase code filter included two lithium-niobate phase modulators (Covega) with 10 GHz RF bandwidth. An arbitrary waveform generator (Euvis, AWG872) provided the drive signals to these modulators through RF amplifiers. A dispersion compensating fiber (OFS, WBDK:84C-L) provided −84 ps/nm dispersion at 1550 nm between the phase modulators. To equalize the overall cavity roundtrip time across wavelengths (dispersion matching), an approximately 2.4 km length of SMF-28e+ was inserted in the cavity in double-pass configuration using a Faraday rotator mirror (FRM). The FRM eliminated the polarization mode dispersion of the SMF-28e+ fiber. A semiconductor optical amplifier (SOA, Covega) was located inside the cavity for amplification, followed by an 80/20 output coupler.

Driving Waveforms

The drive waveforms provided to the first and second phase modulators set the filter transmission properties across time. Once the first modulator waveform was defined, the waveform for the second was found by applying the appropriate delay relative to the inverted first waveform. There are many waveforms that can be used to drive the first modulator. In the embodiment that is presented herein, a chirped sinusoid is used as the basis function for the first modulator waveform, although other waveforms may also be used. Other possible waveforms include pseudo-randomly generated binary (e.g., digital) and/or analog signals, or truly orthogonal codes commonly used in code-division multiple access (CDMA). Truly orthogonal CDMA codes include for example Walsh codes, Walsh Hadamard codes, and Gold codes. The rationale for using a chirped sinusoid in the embodiment presented herein is that the chirped sinusoid lacks a dominant frequency component. Dominant frequencies would create a periodicity in the delay response (i.e., autocorrelation function), which could allow multiple comblines to be transmitted through the filter.

For the first modulator, a repeating waveform was constructed to provide to the first modulator $(f_1(t))$. This waveform was constructed by concatenating a sinusoid that was chirped from 1.0 GHz to 1.9 GHz, or from 1.2 GHz to 2.3 GHz. Each chirping was performed over a duration $t_p$, where $t_p$ is the desired output pulsewidth (the time during which the laser output remains fixed at a given optical frequency). The chirped sinusoid was repeated indefinitely at the first modulator such that each output pulse was "encoded" with the same phase-modulation.

The waveform provided to the second modulator was then constructed by concatenating sections of the chirped sinusoids that were used to form the first waveform. These chirped sinusoids were inverted and delayed based on the desired output wavelength sequence. More specifically, the laser output combline frequency sequence was first defined. Next, a table of optical group delays for each optical combline frequency in this sequence was calculated. Finally, these delays were used to construct the second phase modulator drive signal as described above. Interpolation was used to connect the chirped sinusoid waveforms (FIG. 2(b)). With −84 ps/nm of dispersion between the modulators, the optical group delay difference between adjacent comblines (80 GHz free spectral range) was approximately 54 ps. Because this is significantly smaller than the arbitrary waveform generator clock cycle (125 ps), we created nearly arbitrary delays in the waveform by generating an appropriately different discrete representation of the chirped waveform and sent this new discrete representation to the digital to analog converter. In this way, and as is known in signal sampling and generation, it was possible to shift the delay of the generated signal with a delay precision that is smaller than the arbitrary waveform generator clock cycle.

The digital representations of the chirped sinusoid were phase-shifted to induce delays with sub-clock cycle precision. It is known for example that a digital to analog converter with a sampling frequency of F can generate signals at various phases at or below the Nyquist frequency, $F_{NY}=F/2$. There are two strategies to shift the phase of the signal at f. The first is to delay(shift) the output signals by an integer number of clock cycles. This induces phase shifts of $\pi n(f/F_{NY})$ where n is an integer. For example, at $f=F_{NY}$ the phase of the signal can be set at 0 or $\pi$ using this method. At $f=(1/2)F_{NY}$, the phase of a signal can be set at 0, $\pi/2$, $\pi$, $3\pi,2$. The second strategy to shift the phase is drive the digital to analog converter with a different sampling of the given frequency Both the first and second modulator waveforms were designed such that the combline transmission filter was operated in resonance with the cavity roundtrip time, similar to the operation of Fourier-domain mode-locking.

Phase-Code Filter Performance

Figure 3:
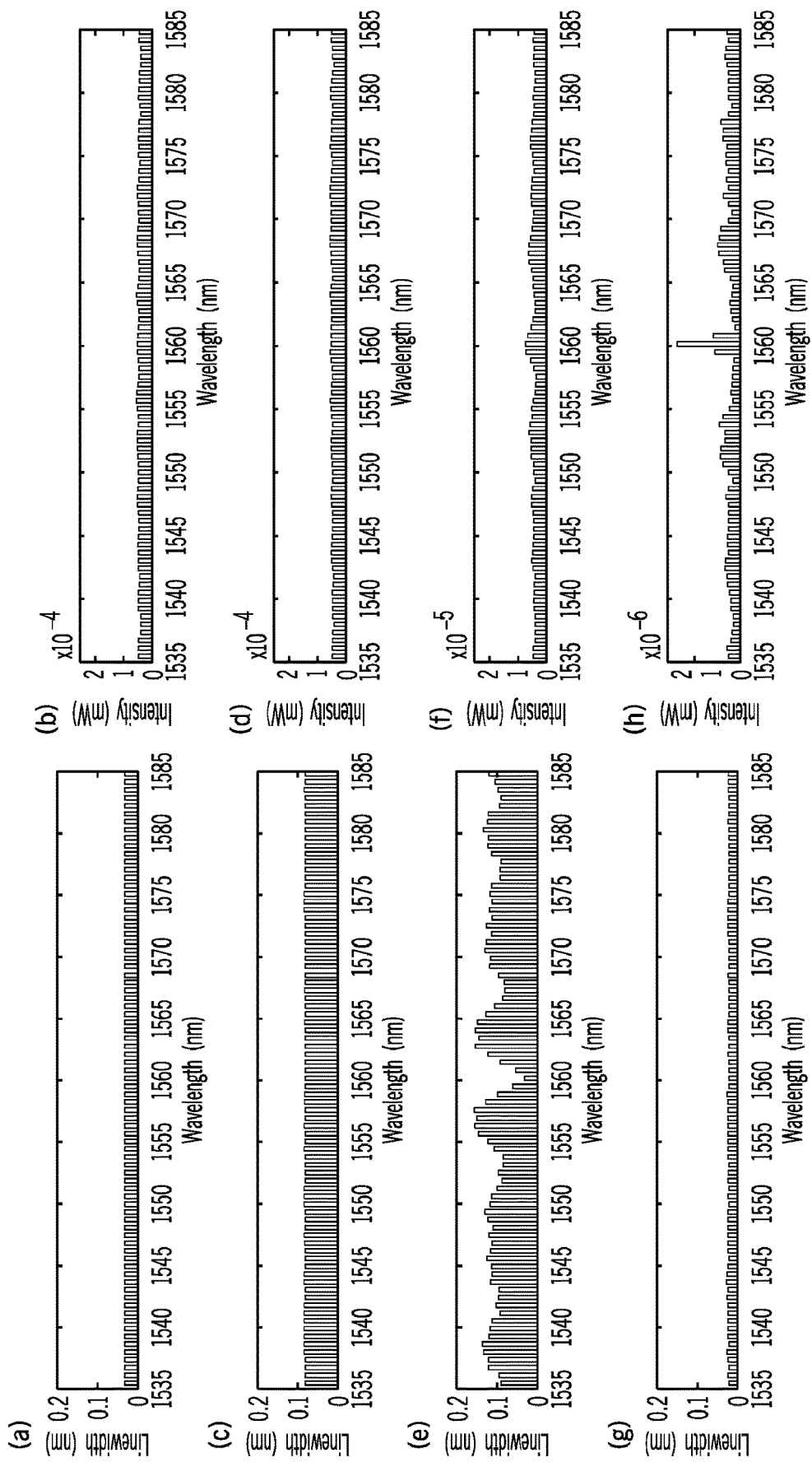
FIG. 3 shows single pass phase code filter performance measurements of each combline. Linewidth (panels a, c, e, g) and intensity (panels b, d, f, h) were measured after passing the first etalon (a, b); after linewidth broadening by the first modulator (c, d); after linewidth recovery by the second modulator (e, f); and after filtering by the second etalon (g, h).

Before building the prototype PCML laser, the performance of the phase-code filter was first characterized in isolation, i.e., outside of its integration into a laser cavity. This was done using the setup shown in FIG. 1(b). Amplified spontaneous emission (ASE) light was used as an input from an SOA. This light was transmitted through an 80 GHz Fabry-Pérot etalon with a finesse of approximately 100. A second, identical etalon was placed at the output and angle-tuned to align its comblines to those of the first etalon. Using an optical spectrum analyzer (Yokogawa, AQ6370C), the linewidth of each combline was characterized as they passed through the filter. Linewidths below 0.02 nm could not be resolved due to resolution limitations of the OSA. In the measurements shown in FIG. 3, the second modulator waveform was configured to decode the combline at 1560 nm. Note that all input comblines were equally broadened by the first phase modulator (FIG. 3(b)), but only the combline at 1560 nm was substantially narrowed after the second phase modulator (FIG. 3(c)). Next, the transmission efficiency of each combline was measured using the OSA. As expected, the narrowed combline was transmitted with high efficiency (FIG. 3(h)). The filter extinction for the other lines was greater than 3.5 dB (FIG. 3(h)).

PCML Laser Performance

Figure 2:
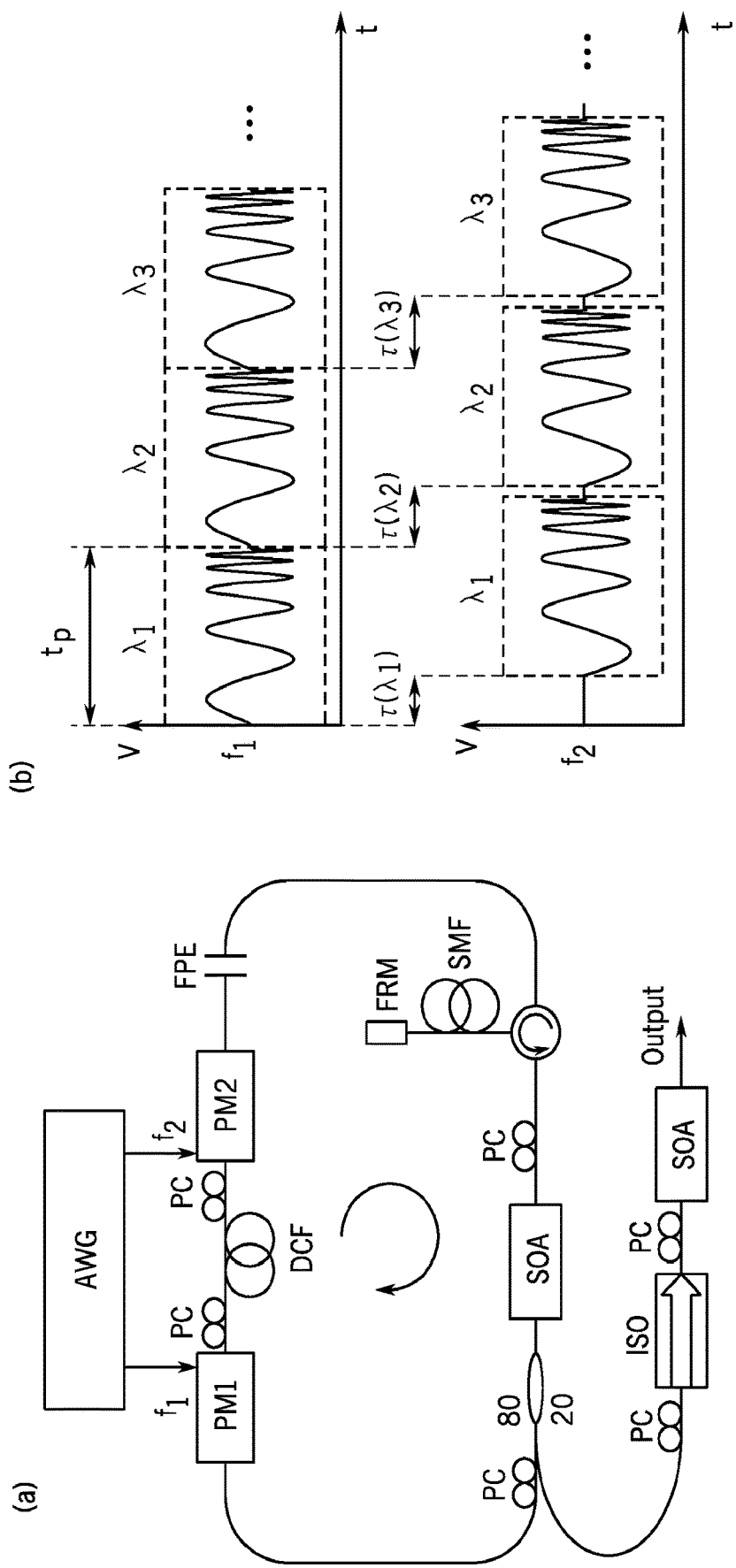
FIG. 2. in panel (a) shows a PCML laser setup and in panel (b) shows an illustration of RF waveform design for phase modulators. AWG, arbitrary waveform generator; PM, phase modulator; PC, polarization controller; FPE, Fabry-Pérot etalon; DCF, dispersion compensating fiber; FRM, Faraday rotating mirror; SMF, single mode fiber; SOA, semiconductor optical amplifier; ISO, isolator.

Next the filter was incorporated into a ring cavity as shown in FIG. 2 and operated at three speeds, specifically 176 kHz (5th harmonic of the cavity), 881 kHz (25th harmonic), and 3.52 MHz (100th harmonic), speeds that were selected so as to recover a plurality of output wavelength bands at frequencies that are integer multiples of the roundtrip frequency of the optical resonator.

Figure 4:
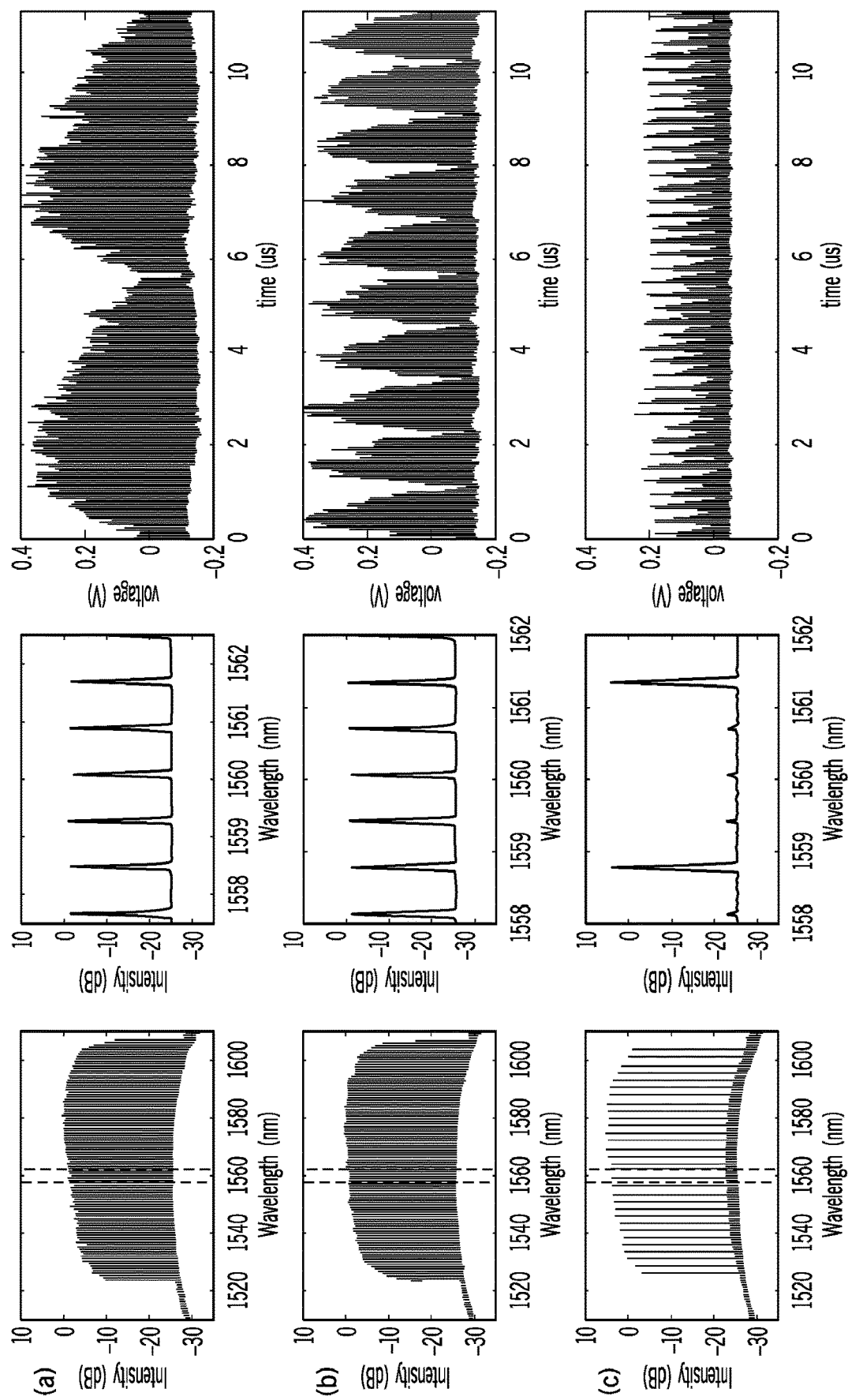
FIG. 4 shows laser spectra (left), spectra in the wavelength range indicated by the red box on the left (middle), and the time trace (right) of the PCML laser operating at: (panel a) 176 kHz, 130 wavelengths, $t_p$=43 ns; (panel b) 881 kHz, 130 wavelengths, $t_p$=8.6 ns; and (panel c) 3.52 MHz, 31 wavelengths, $t_p$=8.6 ns.

FIG. 4 demonstrates the lasing spectra and time traces of the PCML laser in each of these configurations. At 176 kHz, a pulsewidth of 43 ns was used. At 881 kHz, a pulsewidth of 8.6 ns was used. For both of these speeds, the laser output spanned 80 nm at 80 GHz combline spacing. In this prototype laser using the 8 GSPS AWG, consistent performance was not achieved with pulsewidths below 8.6 ns. To achieve 3.52 MHz speeds while maintaining 8.6 ns pulsewidths, the number of output wavelengths was reduced by designing the waveforms to transmit every 4th combline. Note that these changes to laser performance required changes only to the AWG drive signals provided to the phase modulators; no hardware modifications were required. This enabled production of a CR-OCT source that was widely tunable and rapidly re-configurable.

Although the worst-case single pass extinction of the filter was approximately 3.5 dB, the laser output achieves a much higher combline extinction due to the laser cavity resonance. The laser output spectrum illustrated in FIG. 4(c) suggests a spectral extinction in excess of 25 dB. However, when considering that the selected lines have much lower duty cycles than the off-lines, the instantaneous laser extinction may be higher.

Figure 5:
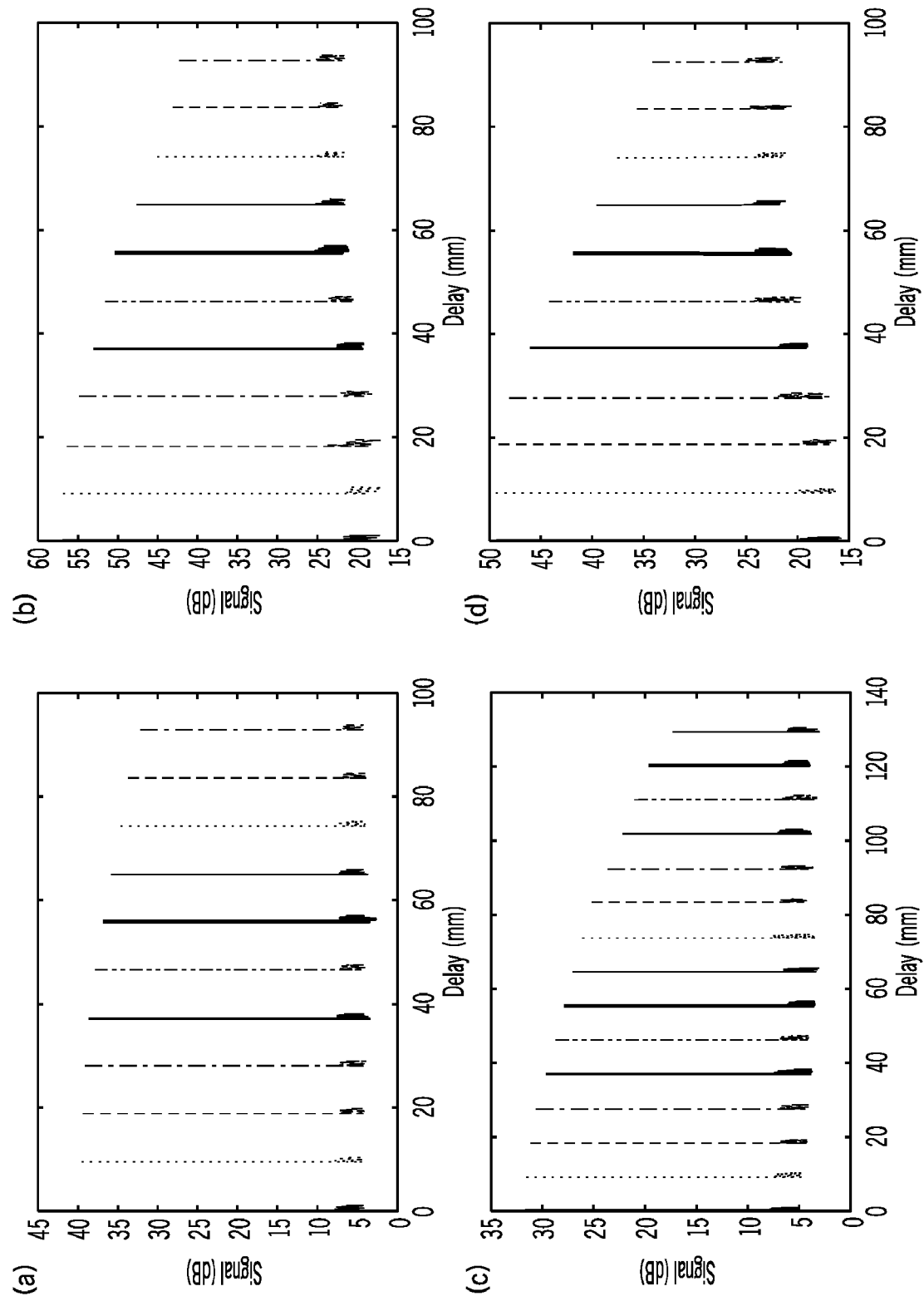
FIG. 5 shows a 6 dB roll-off measurement of PCML laser with various configurations. Panel (a) shows 176 kHz without booster SOA, panel (b) shows 176 kHz with booster SOA, panel (c) shows 881 kHz without booster SOA, and panel (d) shows 881 kHz with booster SOA.

The PCML laser coherence length was measured by acquiring fringe signals as a function of sample arm mirror position (relative to the reference arm). The measurement was done for 176 kHz and 881 kHz configurations for the analysis of the relationship between the pulse width and the coherence length of the source. The point-spread functions were calculated for fringe signals at the same circular delay position within increasing orders. The axial resolution was measured from acquired point spread functions to be 17 μm, which was consistent with and without the booster SOA. The coherence length (6 dB roll-off) was 85 mm (mirror displacement) for pulsewidths of 43 ns (176 kHz A-line) and 8.6 ns (881 kHz A-line) (FIG. 5(a, c)). This would enable a 170 mm imaging range using circular-ranging with in-phase and quadrature fringe signal detection that discriminates between the positive and negative delay space. Note that the coherence length was measured to be the same for both pulsewidths. It would not be anticipated that the coherence length would be affected by changing the sequence of output comblines at the same pulsewidth (e.g., 881 kHz and 3.52 MHz outputs), although this was not measured explicitly. Because the prototype laser output power was low (approximately 1 mW), the PCML coherence length was also tested with a booster SOA (outside of cavity). The booster SOA increased power to 50 mW and decreased the coherence length to 50 mm (100 mm CR-OCT imaging range), as shown in FIG. 5(b, d). This reduction is a consequence of linewidth broadening in the SOA. It was also observed that the booster SOA increased the noise floor, which needs to be examined further.

CR-OCT Imaging Using the PCML Laser

Figure 6:
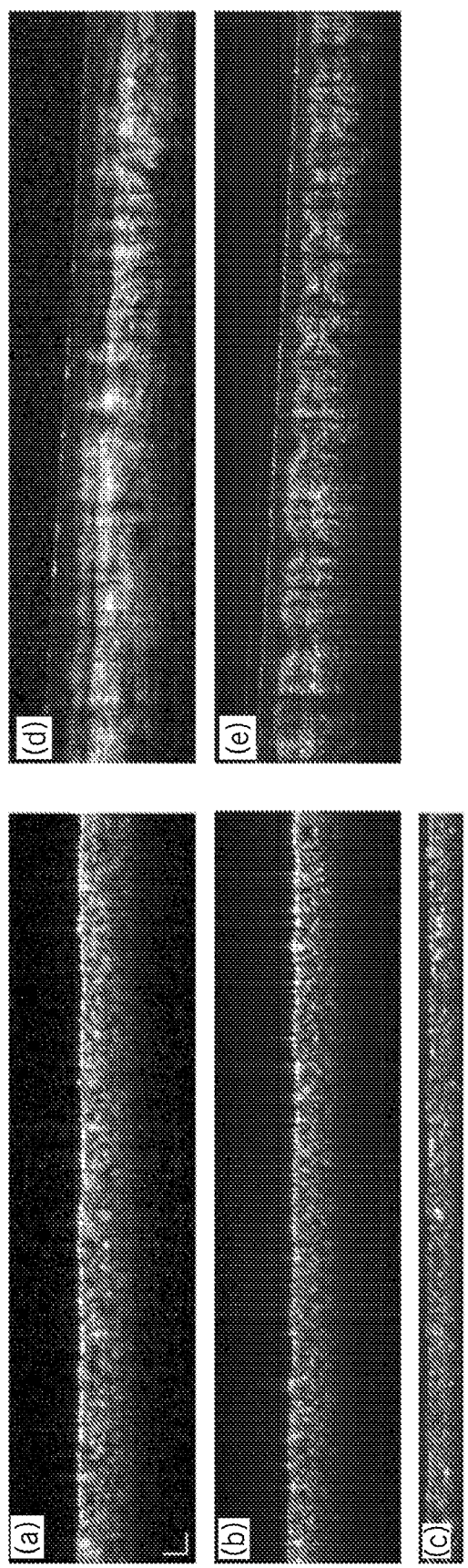
FIG. 6 shows cross-sectional images of (panels a-c) IR card and (panels d, e) a finger with different A-line configurations with the same scales and corresponding circular ranges. The data was collected at 3 different imaging speeds: (a, d) 176 kHz, (b, e) 881 kHz, and (c) 3.52 MHz. The dynamic ranges were (a, b) 20 dB, (c) 10 dB, and (d, e) 18 dB. Scale bar (lower left corner of panel a): 200 μm.

CR-OCT images were acquired at each of the three imaging speeds (176 kHz, 881 kHz, and 3.52 MHz). As expected, the circular depth/delay range for the 3.52 MHz image is different than that for 176 kHz and 881 kHz due to the generation of a 320 GHz frequency comb rather than an 80 GHz frequency comb. The laser was used with the booster SOA for imaging experiments. A quadrature demodulation circuit described in Siddiqui et al. ("Compensation of spectral and rf errors in swept-source OCT for high extinction complex demodulation," Optics Express 23(5), 5508-5520 (2015), incorporated herein by reference) was used to create in-phase and quadrature fringes needed for CR-OCT. Output fringes were directed to balanced photo-receivers (Thorlabs, PDB465C) for detection. The digitizer (Signatec, PX14400) acquired the signal from the detectors at 250 MS/s, which was significantly higher than was required to capture the 8.6 ns (3.52 MHz and 881 kHz) and 43 ns (176 kHz) pulsewidths. FIG. 6 shows the acquired CR-OCT images of an IR detection card (FIGS. 6(a)-6(c)) and a finger (FIGS. 6(d)-6(e)) at each lasing speed, with averaging over 25 adjacent cross sections. The depths of the circular ranges were approximately 1.9 mm for 176 kHz and 881 kHz configurations and 0.48 mm for 3.52 MHz configuration. Note that the total imaging depth range and the circular delay range are distinct parameters; signals can be acquired over the total imaging range, which is limited by the source coherence, but appear within a compressed image equal to the circular delay range.

Embodiments of a novel laser architecture have been demonstrated which provide stepped frequency comb outputs for moderate speed CR-OCT. In addition to enabling CR-OCT within the 100 kHz to several MHz speed range, the PCML laser design has several unique features. It was shown in the operation of the laser at 3.52 MHz that the PCML laser allows the user to set specific comblines, skip comblines, or modify the sequence of generated comblines. This was done through design of the drive waveforms, without hardware modification, and can be used to create highly re-configurable sources for CR-OCT. The speed of the PCML laser was not directly defined by the magnitude of the intra-cavity dispersion as is the case for SPML lasers. This allowed operation of the PCML laser at much more moderate speeds. The upper speed limits of the PCML laser are not well-defined at this time. In principle, high-speed operation is possible. However, the high-bandwidth RF drive signals that would be required might be difficult to generate, and, at this time, the SPML architecture is likely more favorable for extremely high-speed operation. Additional advantages of the PCML architecture include a 100% duty cycle output and a linear-in-time output that does not require k-clocking or k-space resampling after digitization. Conversely, at present, the primary deficiency of the PCML laser is noise performance, which is significantly higher than mature OCT laser technologies.

Reduction of Relative Intensity Noise (RIN)

Figure 7:
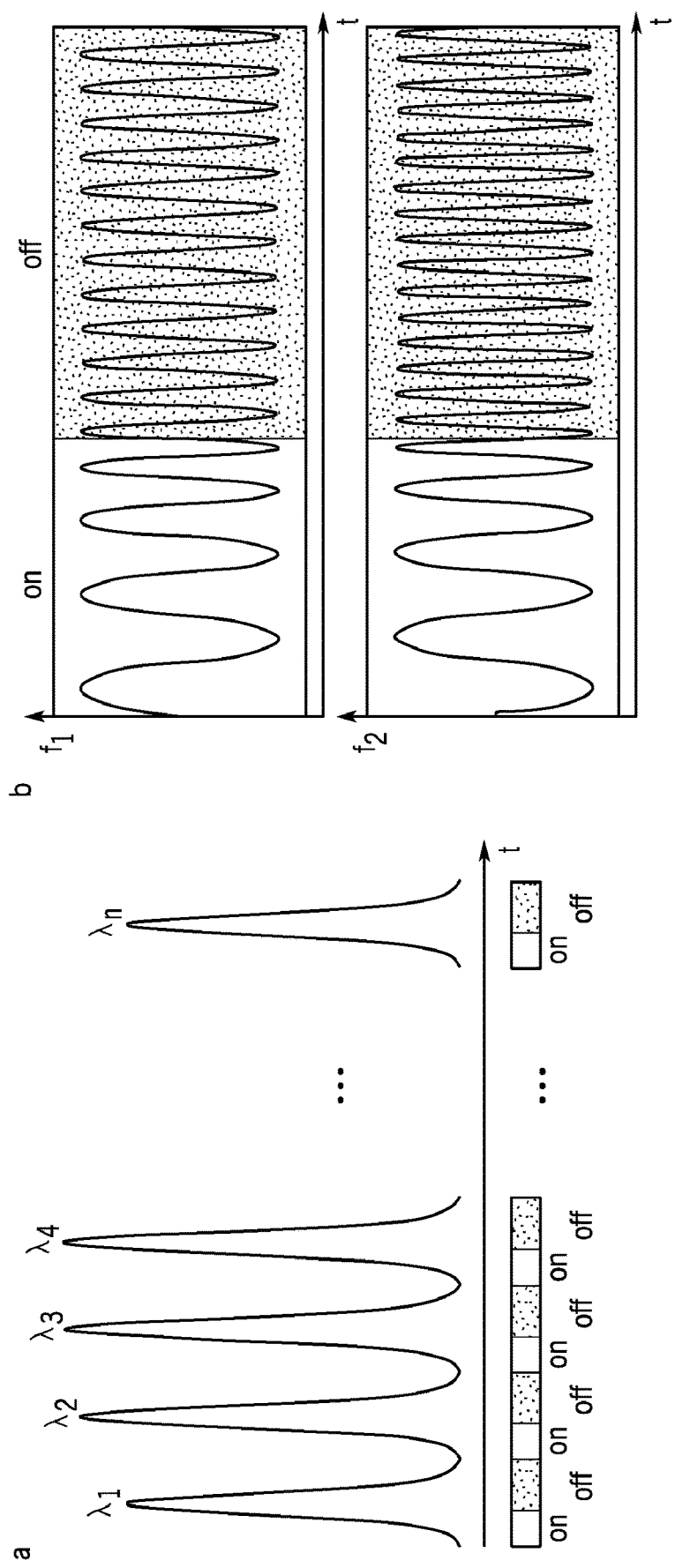
FIG. 7, panel (a) shows PCML A-line architecture with laser on/off operation, while panel (b) shows AWG waveform design for each modulator for laser on/off operation.
Figure 8:
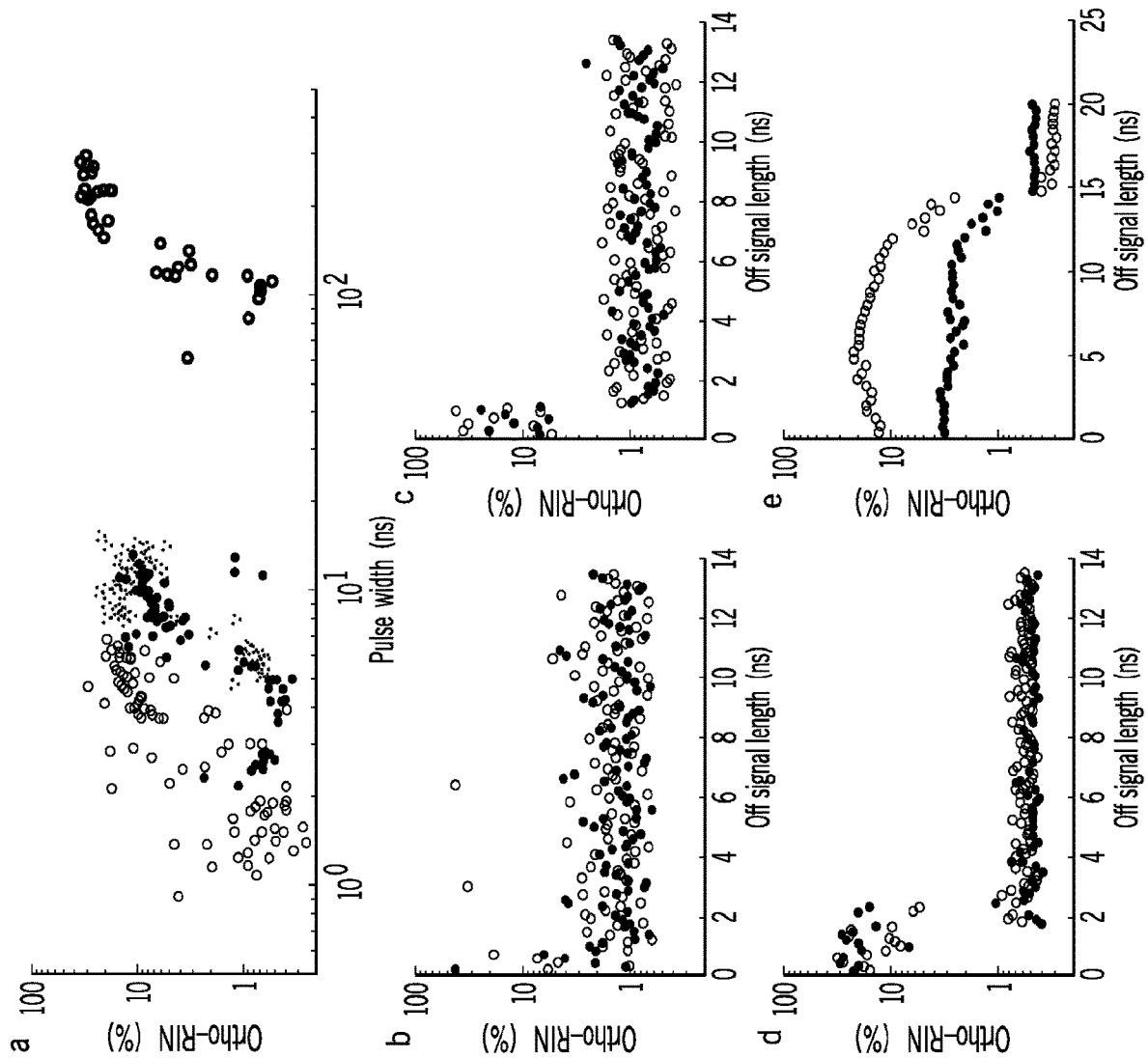
FIG. 8, panel (a) shows ortho-RIN of the single pulse experiment, where red/blue/green/purple dots correspond to 150/300/500/8000 Finesse, respectively, at 1560 nm, while panels (b-e) show ortho-RIN plots of the double pulse experiment for 150/300/500/8000 Finesse, respectively. Blue dots correspond to 1560 nm which comes first and orange dots correspond to 1559 nm which comes after.
Figure 9:
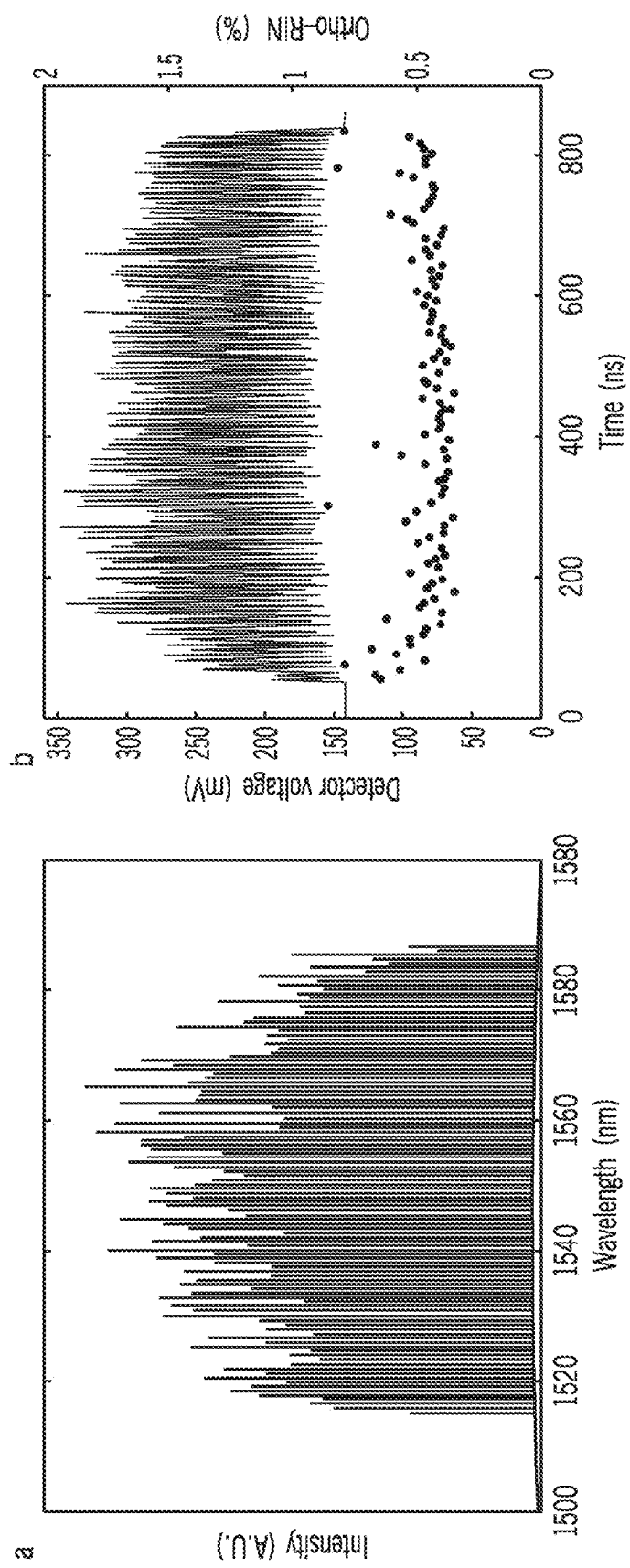
FIG. 9, panel (a) shows the OSA spectrum of the PCML laser. (b) Time trace and Ortho-RIN at the peak of each pulse.
Figure 10:
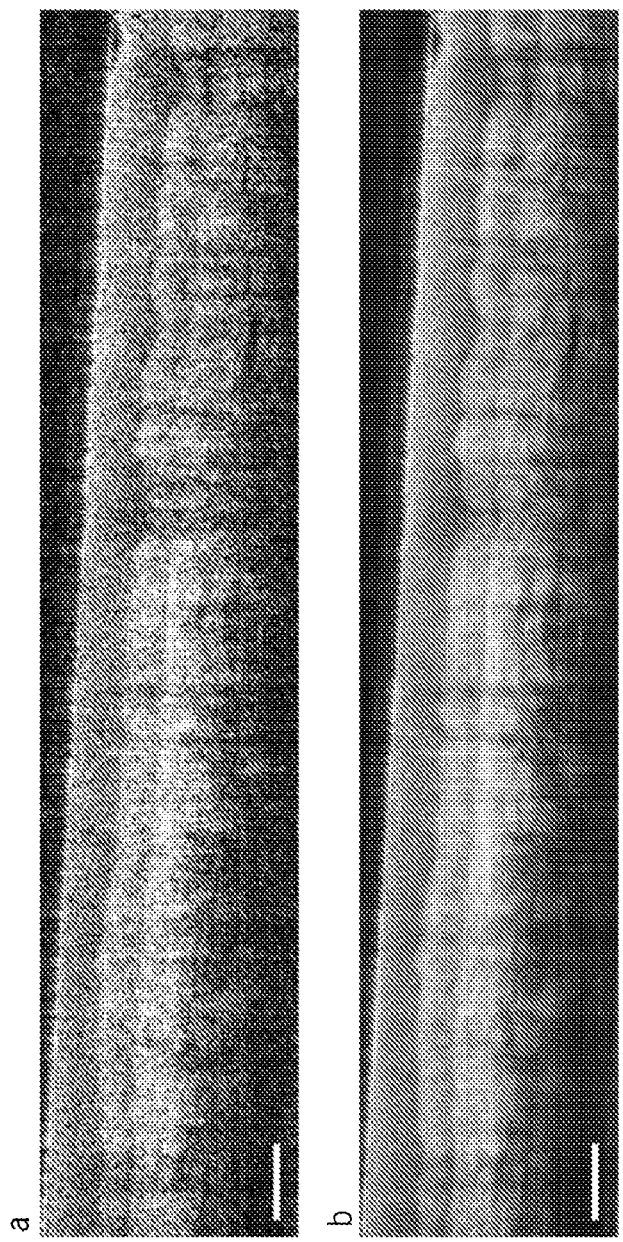
FIG. 10, panel (a) shows a non-averaged finger cross-sectional image acquired from the PCML-OCT system, while panel (b) shows the finger cross-sectional image at the same location with averaging of 25 out-of-plane images.

Certain embodiments of the invention provide procedures for reducing noise in the disclosed source. In certain embodiments, the disclosed PCML source may impose high relative intensity noise (RIN) that could limit its utility in practice. Thus, disclosed herein are procedures that can make PCML highly stable by adjusting the driving waveform for the phase modulators (EOMs) to generate discrete pulses at each wavelength (with a "laser off" time between pulses) and with specific pulse durations (pulsewidths) that are related to the etalon Finesse used in the cavity (FIG. 7). Presented herein is an empirical analysis of laser noise for different waveform designs (FIG. 8). Also presented are results showing the improved system performance (FIG. 9) and imaging (FIG. 10).

The noise-reducing procedures can be carried out using systems such as those disclosed above (e.g. see FIG. 8(a)).

One modification of the system was to test several different etalons having similar FSRs and different Finesses for the noise analysis, where one of the etalons was selected for the final laser demonstration.

The driving waveforms for the phase modulators were designed to include an "on" and "off" state for each pulse (FIG. 7(a)). The idea of having on and off states originated from the integration time (switch time) of the etalon, which is range of group delay transit times for light of different optical frequencies to pass through the etalon. This integration time is the inverse of the linewidth of each etalon combline. An optical pulse of duration less than the integration time will be temporally stretched when passed through the etalon, resulting in a pulse with duration that is approximately given by the integration time. By designing in an off time located between pulses and of sufficient duration, one can avoid temporally overlapped pulses at the output of the etalon. Temporally overlapping pulses causes lasing instability and higher intensity noise. Based on this, it was determined that the optimal on/off times would be a function of etalon linewidth (which is a function of the Etalon Finesse and FSR).

During the laser on periods, the chirped waveforms disclosed above were used to control the phase modulators. However, only one chirped waveform was used rather than multiple waveforms, in order to achieve stable lasing over the multiple cavity roundtrips. During the laser off periods, a uniform (non-chirped) sinusoidal waveform having different RF frequencies was used on each phase modulator (FIG. 7(b)). Various experiments were performed to find the optimal laser on/off time for different linewidths of the etalons. Optical pulses are generated during the waveforms associated with the on times at the selected wavelength determined by the waveform properties as described above. The waveforms associated with the off times suppress transmission of all comblines, and turns the laser off transiently.

In a first set of experiments three different physical etalons, all having 80-85 GHz FSRs, and with Finesses of 150, 500, and 8000, were used. A laser source with four different effective Finesses was created using the three physical etalons: 150, 300 (double pass of the 150 etalon), 500, and 8000. In the first experiment, a single lasing line of approximately 1560 nm was made which repeated over time, where the repeated lines were sufficiently spaced relative to each other in time, each having different "laser on" times. The laser RIN and FWHM pulse width were examined in order to find the optimal PW for RIN.

In a second set of experiments a double line lasing of approximately 1560 nm and 1559 nm repeating over time was made, with different "laser off" times between them. The laser RIN was examined with respect to the off time to find the minimal off time required to obtain the optimal RIN level. After finding the optimal conditions for RIN, additional experiments were performed to demonstrate modified PCML operation with the improved RIN sensitivity. Imaging of the skin of a subject's finger was performed using the same imaging optics as above in order to provide a comparison of image quality.

Experiments were first conducted to determine the noise performance of the modified laser as a function of "laser on" time. These measurements were performed in a laser configured to repeatedly generate pulses at the same wavelength (1560 nm). The laser noise performance was characterized for the laser as a function of time (which determines the output laser pulsewidth). Noise was characterized across all four etalon effective Finesse levels (150, 300, 500, 8000)

and across pulsewidths from 0.134 ns to 300 ns (see FIG. 8(a)). The laser off time for each configuration was 0.284 ns for Finesses of 150, 300, and 500, and 0.568 ns for Finesse of 8000.

For all configurations tested, no lasing was observed when the "laser on" time was too short (FIG. 8(a)). When the "laser on" time was sufficiently long to achieve lasing, the lasing begins and tends to be fairly stable. As the "laser on" time was further increased so that the pulsewidths got larger, the laser became unstable and the intensity noise increased significantly.

The pattern that was observed was that there was no lasing transitioning to stable lasing transitioning to unstable lasing as the laser on time/pulsewidth was increased, where the scale factor for these transitions depends on the etalon's Finesse. This defines a strategy to optimally configure the laser one time for stable lasing as a function of the etalon Finesse. The optimal operating condition for laser on-time is approximately given by the inverse of the linewidth of each etalon comb-line, where the etalon linewidth is given by the etalon FSR divided by the Finesse. The optimal pulsewidth is therefore approximately given by the etalon Finesse divided by the etalon FSR.

Experiments were then conducted to determine the noise performance as a function of "laser off" time. These measurements were performed in a laser configured to repeatedly generate pulses that alternate between two wavelengths (1560 nm and 1559 nm) as indicated above. See FIGS. 8(b), 8(c), 8(d), and 8(e). The laser was configured to have a "laser off" time scale ranging from 0.134 ns to approximately 20 ns. The "laser on" time for each configuration was chosen from prior results to give stable lasing (1.88 ns for 150, 2.97 ns for 300, 5.38 ns for 500, and 80.6 ns for Finesse 8000).

Despite the "laser on" time being in the stable range, both pulses showed a significant amount of noise when the "laser off" time was too short, which means they are not well separated. Once the "laser off" time is longer than a certain duration, the pulses became stable as in the previous experiment. The threshold of the "laser off" time for stable lasing also scales with the integration time of the etalon determined by the linewidth. It was also found that RIN is more consistent with higher Finesse, possibly because of the longer "laser on" time so that the signal from the AWG is capable of making more accurate and predictable extinctions.

Finally, experiments to characterize the noise of the PCML laser generated a full frequency comb output at 110 wavelengths. The PCML-OCT laser was demonstrated with the 500 Finesse etalon having a 1.16 MHz A-line rate. The laser on and off times were set to 3.6 ns and 4.4 ns, respectively, for each of 110 pulses over a 75 nm range centered at 1050 nm, settings that were derived from results of FIG. 8.

The ortho-RIN of each pulse was below 1 percent when measured with 2 GHz bandwidth detector and digitizer. The rest of the system including interferometry, detection part, and the imaging microscope was the same as the source disclosed above. The system sensitivity achieved was 104 dB with 35 mW sample arm power, and the 6-dB roll-off depth was 74 mm. From the work disclosed above it can be assumed that the sensitivity roll-off of the PCML would be even longer without the booster SOA. Imaging of finger skin also showed a significant SNR increase for approximately 20 dB from the previous work.

Because there is an optimal pulsewidth for a given etalon, the noise performance of the laser is reduced when the pulsewidth is extended beyond this optimum in an effort to reduce imaging speed. In one embodiment, the laser can be configured for slower speeds by generating an effective long pulse at a given wavelength through repeating the same wavelength multiple times. In one example, a 5 ns pulse at 1550.00 nm can be repeated ten times, creating a pulse train that is 50 ns in duration comprising 10 individual pulses. The detection system can use low-pass analog filtering to convert this pulse train to a single 50 ns pulse. In this way, the laser speed can be reduced while optimal noise performance in maintained. The number of repeated pulses at each wavelength can be any integer, subject to the aforementioned constraint that the laser output sequence is equal to or is a harmonic of the cavity round trip time.

Computer and Optical Systems

Figure 11:
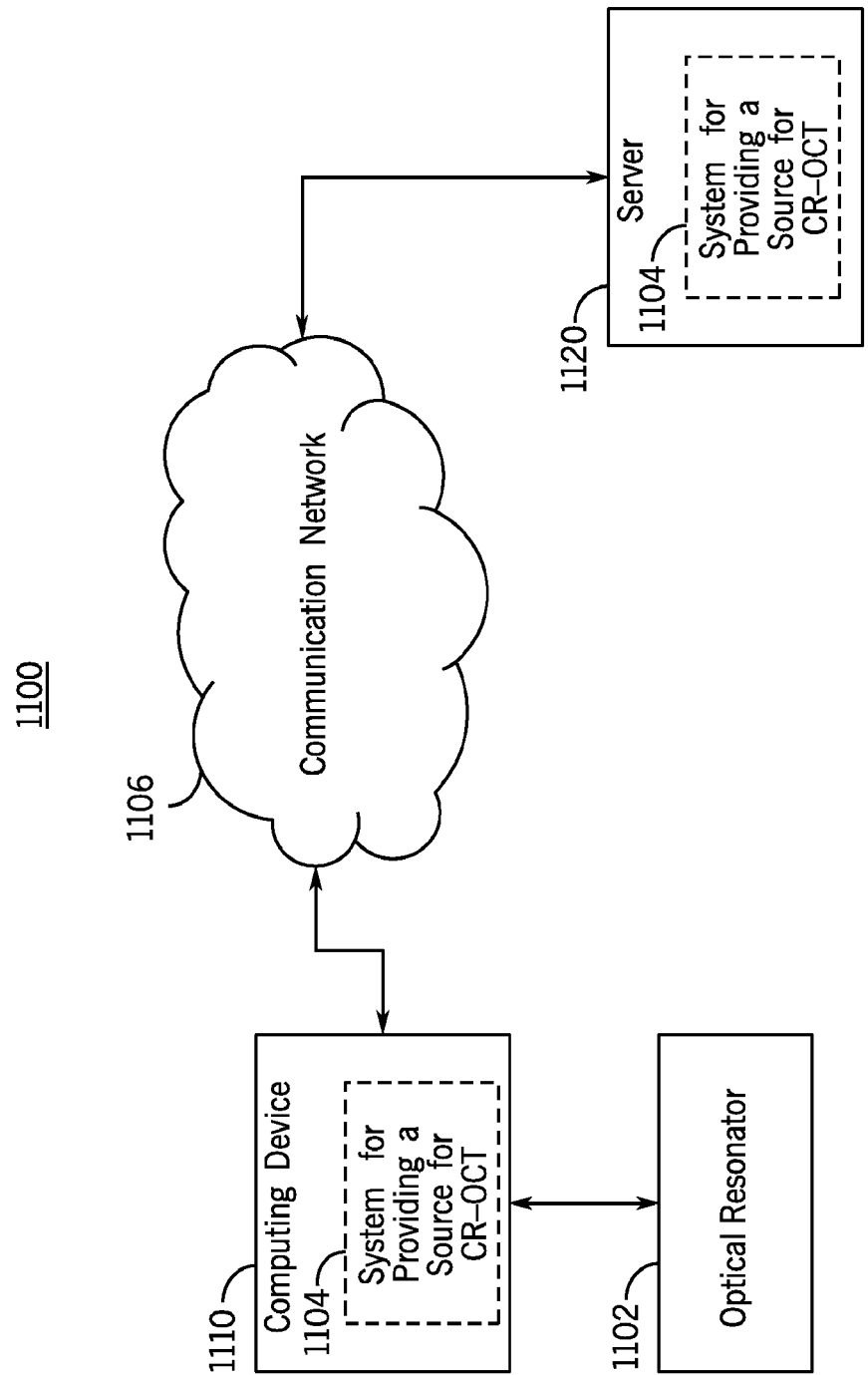
FIG. 11 shows an example of a system for providing a source for circular-ranging OCT in accordance with some embodiments of the disclosed subject matter.

Turning to FIG. 11, an example 1100 of a system (e.g. a data collection and processing system) for providing a source for circular-ranging OCT is shown in accordance with some embodiments of the disclosed subject matter. In some embodiments, a computing device 1110 can execute at least a portion of a system for providing a source for CR-OCT 1104 and provide control signals to one or more optical modulators associated with an optical resonator 1102. Additionally or alternatively, in some embodiments, computing device 1110 can communicate information regarding the control signals to or from a server 1120 over a communication network 1106, which can execute at least a portion of system for providing a source for CR-OCT 1104. In some such embodiments, server 1120 can return information to computing device 1110 (and/or any other suitable computing device) relating to the control signals for system for providing a source for CR-OCT 1104. This information may be transmitted and/or presented to a user (e.g. a researcher, an operator, a clinician, etc.) and/or may be stored (e.g. as part of a research database or a medical record associated with a subject).

In some embodiments, computing device 1110 and/or server 1120 can be any suitable computing device or combination of devices, such as a desktop computer, a laptop computer, a smartphone, a tablet computer, a wearable computer, a server computer, a virtual machine being executed by a physical computing device, etc. As described herein, system for providing a source for CR-OCT 1104 can present information about the control signals to a user (e.g., researcher and/or physician). In some embodiments, optical resonator 1102 may include optical components such as those disclosed herein (e.g. see FIG. 2(a)).

In some embodiments, communication network 1106 can be any suitable communication network or combination of communication networks. For example, communication network 1106 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, etc. In some embodiments, communication network 1106 can be a local area network, a wide area network, a public network (e.g., the Internet), a private or semi-private network (e.g., a corporate or university intranet), any other suitable type of network, or any suitable combination of networks. Communications links shown in FIG. 11 can each be any suitable communications link or combination of communications links, such as wired links, fiber optic links, Wi-Fi links, Bluetooth links, cellular links, etc.

Figure 12:
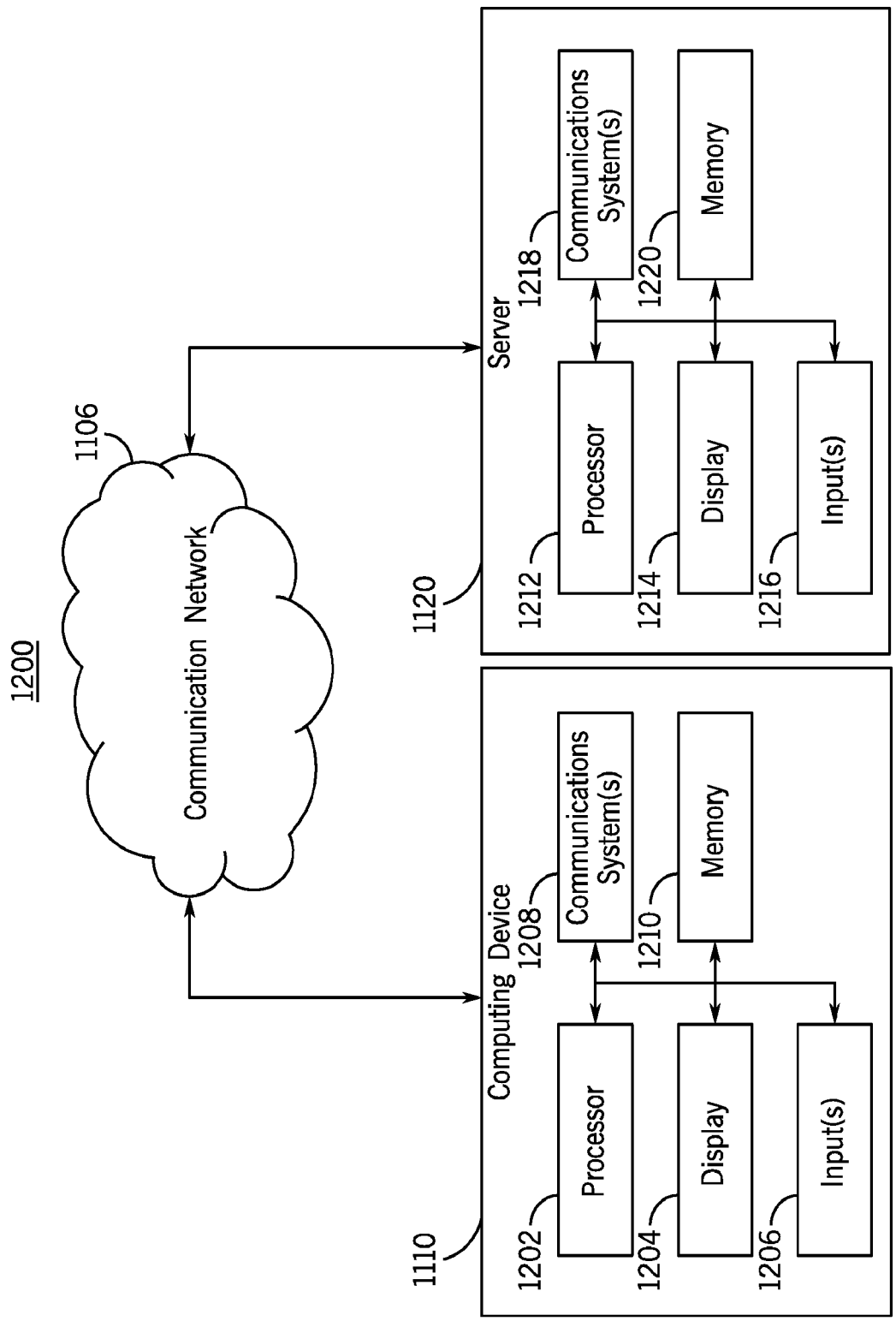
FIG. 12 shows an example of hardware that can be used to implement a computing device and server in accordance with some embodiments of the disclosed subject matter.

FIG. 12 shows an example 1200 of hardware that can be used to implement computing device 1110 and server 1120 in accordance with some embodiments of the disclosed subject matter. As shown in FIG. 12, in some embodiments, computing device 1110 can include a processor 1202, a display 1204, one or more inputs 1206, one or more communication systems 1208, and/or memory 1210. In some embodiments, processor 1202 can be any suitable hardware processor or combination of processors, such as a central processing unit, a graphics processing unit, etc. In some embodiments, display 1204 can include any suitable display devices, such as a computer monitor, a touchscreen, a television, etc. In some embodiments, inputs 1206 can include any suitable input devices and/or sensors that can be used to receive user input, such as a keyboard, a mouse, a touchscreen, a microphone, etc.

In some embodiments, communications systems 1208 can include any suitable hardware, firmware, and/or software for communicating information over communication network 1106 and/or any other suitable communication networks. For example, communications systems 1208 can include one or more transceivers, one or more communication chips and/or chip sets, etc. In a more particular example, communications systems 1208 can include hardware, firmware and/or software that can be used to establish a Wi-Fi connection, a Bluetooth connection, a cellular connection, an Ethernet connection, etc.

In some embodiments, memory 1210 can include any suitable storage device or devices that can be used to store instructions, values, etc., that can be used, for example, by processor 1202 to present content using display 1204, to communicate with server 1120 via communications system(s) 1208, etc. Memory 1210 can include any suitable volatile memory, non-volatile memory, storage, or any suitable combination thereof. For example, memory 1210 can include RAM, ROM, EEPROM, one or more flash drives, one or more hard disks, one or more solid state drives, one or more optical drives, etc. In some embodiments, memory 1210 can have encoded thereon a computer program for controlling operation of computing device 1110. In such embodiments, processor 1202 can execute at least a portion of the computer program to present content (e.g., images, user interfaces, graphics, tables, etc.), receive content from server 1120, transmit information to server 1120, etc.

In some embodiments, server 1120 can include a processor 1212, a display 1214, one or more inputs 1216, one or more communications systems 1218, and/or memory 1220. In some embodiments, processor 1212 can be any suitable hardware processor or combination of processors, such as a central processing unit, a graphics processing unit, etc. In some embodiments, display 1214 can include any suitable display devices, such as a computer monitor, a touchscreen, a television, etc. In some embodiments, inputs 1216 can include any suitable input devices and/or sensors that can be used to receive user input, such as a keyboard, a mouse, a touchscreen, a microphone, etc.

In some embodiments, communications systems 1218 can include any suitable hardware, firmware, and/or software for communicating information over communication network 1106 and/or any other suitable communication networks. For example, communications systems 1218 can include one or more transceivers, one or more communication chips and/or chip sets, etc. In a more particular example, communications systems 1218 can include hardware, firmware and/or software that can be used to establish a Wi-Fi connection, a Bluetooth connection, a cellular connection, an Ethernet connection, etc.

In some embodiments, memory 1220 can include any suitable storage device or devices that can be used to store instructions, values, etc., that can be used, for example, by processor 1212 to present content using display 1214, to communicate with one or more computing devices 1110, etc. Memory 1220 can include any suitable volatile memory, non-volatile memory, storage, or any suitable combination thereof. For example, memory 1220 can include RAM, ROM, EEPROM, one or more flash drives, one or more hard disks, one or more solid state drives, one or more optical drives, etc. In some embodiments, memory 1220 can have encoded thereon a server program for controlling operation of server 1120. In such embodiments, processor 1212 can execute at least a portion of the server program to transmit information and/or content (e.g., results of a tissue identification and/or classification, a user interface, etc.) to one or more computing devices 1110, receive information and/or content from one or more computing devices 1110, receive instructions from one or more devices (e.g., a personal computer, a laptop computer, a tablet computer, a smartphone, etc.), etc.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

Figure 13:
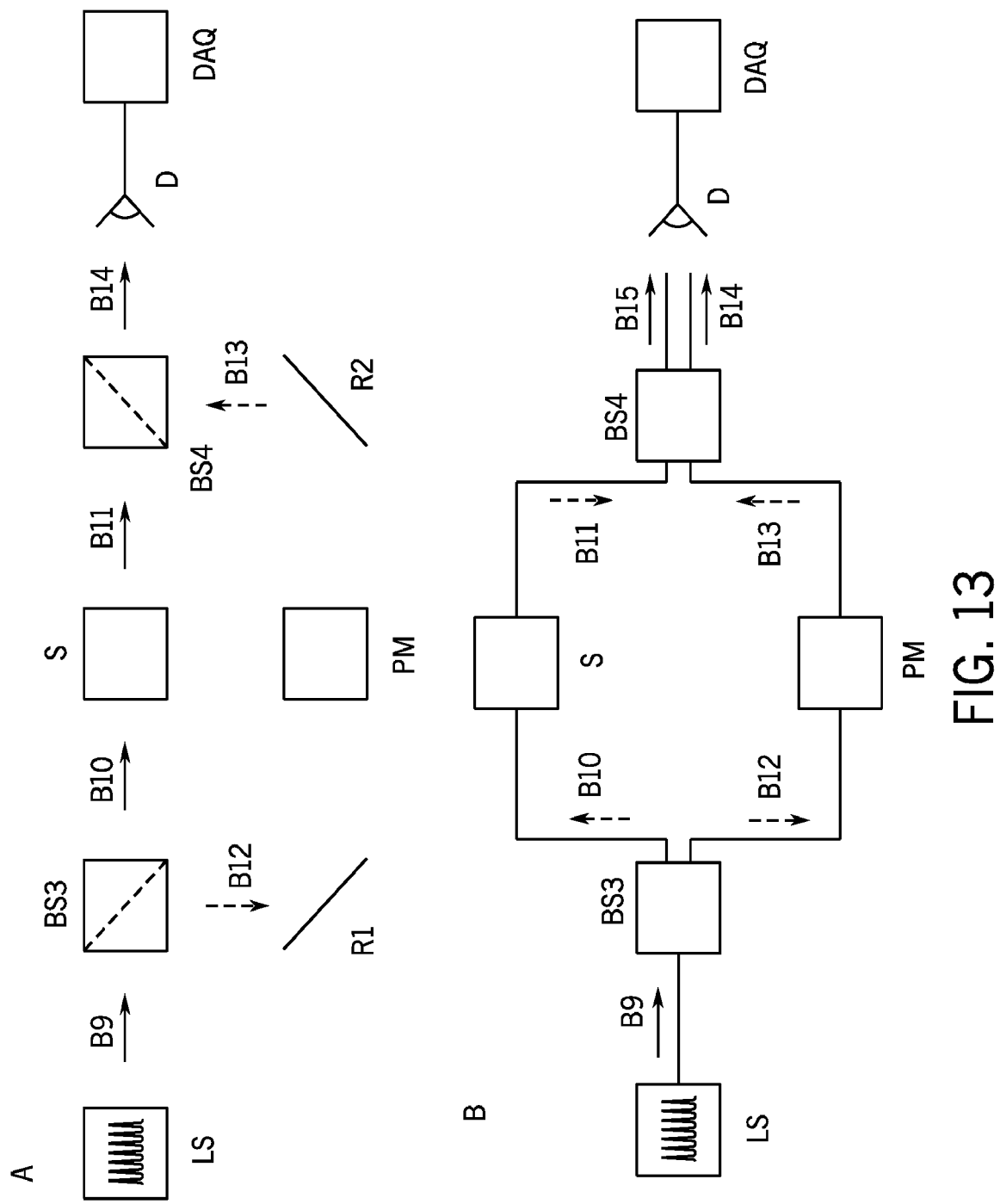
FIG. 13 provides diagrams of interferometry systems that may be used in conjunction with various embodiments disclosed herein, where panel (A) shows a Mach-Zehnder type interferometer that may be implemented using free space optics and panel (B) shows a fiber arrangement.

FIG. 13 provides diagrams of interferometry systems that may be used in conjunction with various embodiments of the invention. FIG. 13 illustrates a Mach-Zehnder type interferometer that may be implemented using free space optics (FIG. 13, panel A) or a fiber arrangement (FIG. 13, panel B). Other interferometer types (e.g. Michelson) can also be applied. The light source LS in either panel A or panel B of FIG. 13 may be an embodiment of a PCML laser such as those disclosed herein. Beam B9, emitted from LS, is directed to the interferometer input where it is split into two paths of approximately equal length using a beam splitter (BS3). B10 is directed towards a sample S. The backscattered light from the object of interest is then directed towards the interferometer output (B11). In the reference arm, beam B12 is directed towards a phase modulator (PM). The beam after the PM (i.e. beam B13) is directed to the interferometer output to interfere with beam B11 after being combined by BS4. The output beam B14 is then detected by a detector D (e.g. a photodiode). Alternatively, a fiber-based interferometer shown in FIG. 13, panel B readily allows balanced detection due to a phase shift of $\pi$ between output beams B14 and B15. The detected signal is digitized using data collection and processing system (which may include a data acquisition board or real time oscilloscope (DAQ)) at a sampling rate $f_S$. Several wavelength sweeps (A1, A2, ..., An) may be acquired to form a 2-dimensional or 3-dimensional image.

Thus, while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

What is claimed is:

1. A source for providing electromagnetic radiation within a particular spectral range, comprising:
    a ring-shaped optical resonator for circulating a plurality of wavelength bands including:
    a first optical phase modulator,
    a first chromatic dispersion device,
    a second optical phase modulator,
    a multi-line spectral domain filter,
    a second chromatic dispersion device, and
    an optical amplifier;
    a controller coupled to the first optical phase modulator and the second optical phase modulator which is configured to drive the first optical phase modulator with a first waveform and the second optical phase modulator with a second waveform,
    the first chromatic dispersion device being configured between the first optical phase modulator and the second optical phase modulator to provide chromatic dispersion so as to subject each of the plurality of wavelength bands to a respective plurality of different time delays,
    the first optical phase modulator and the second optical phase modulator being configured to create spectral broadening by the first optical phase modulator of each of the plurality of wavelength bands and spectral recovery by the second optical phase modulator of a particular wavelength band of the plurality of wavelength bands by modulating a first phase using the first optical phase modulator driven by the first waveform and, after a particular time delay, modulating a second phase using the second optical phase modulator driven by the second waveform comprising an inverse of the first waveform,
        the particular time delay being determined so as to create spectral recovery for the particular wavelength band of the plurality of wavelength bands,
    the multi-line spectral domain filter being configured to provide multi-line spectral filtering with narrow bandwidths in order to induce power loss for each of the plurality of wavelength bands except for the particular wavelength band,
    the second chromatic dispersion device being configured to provide chromatic dispersion compensation to an output of the multi-line spectral domain filter in order to compensate a group delay dispersion within the ring-shaped optical resonator and match a roundtrip frequency for each of the plurality of wavelength bands, and
    the first and second waveforms being configured to create a periodic phase modulation for recovery of the plurality of wavelength bands at a frequency that is an integer multiple of a roundtrip frequency of the ring-shaped optical resonator.

2. The source of claim 1, wherein the ring-shaped optical resonator further comprises an optical isolator which is configured to provide optical isolation to make lasing proceed in the ring-shaped optical resonator in one direction.

3. The source of claim 1, wherein at least one of the first optical phase modulator and the second optical phase modulator comprises an electro-optic phase modulator.

4. The source of claim 3, wherein at least one of the first optical phase modulator and the second optical phase modulator comprises a Lithium-Niobate phase modulator.

5. The source of claim 1, wherein the first chromatic dispersion device is a dispersive fiber, a chirped fiber Bragg grating, a fiber Bragg grating array, or a reflecting fiber delay line.

6. The source of claim 5, wherein the second chromatic dispersion device is a dispersive fiber, a chirped fiber Bragg grating, a fiber Bragg grating array, or a reflecting fiber delay line.

7. The source of claim 6, wherein the first chromatic dispersion device is a different type of device from the second chromatic dispersion device.

8. The source of claim 1, wherein the multi-line spectral domain filter comprises a Fabry-Pérot etalon.

9. The source of claim 1, wherein the optical amplifier is a semiconductor optical amplifier or an erbium-doped fiber amplifier.

10. The source of claim 1, wherein the first chromatic dispersion device provides anomalous chromatic dispersion and the second chromatic dispersion device provides normal chromatic dispersion.

11. The source of claim 1, wherein the first chromatic dispersion device provides normal chromatic dispersion and the second chromatic dispersion device provides anomalous chromatic dispersion.

12. The source of claim 1, wherein the controller comprises a two-channel arbitrary waveform generator.

13. The source of claim 12, further comprising an RF amplifier to amplify the first and second waveforms.

14. The source of claim 12, wherein the first and second waveforms are generated by different discrete representations of the first and second waveforms such that the delay between the first and second waveforms can be controlled to a precision that is higher than the digital to analog sampling frequency.

15. The source of claim 1, wherein the ring-shaped optical resonator further comprises an output coupler which is configured to emit a first output electromagnetic radiation based on the plurality of wavelength bands.

16. The source of claim 1, wherein the particular time delay is adjusted so that each of the plurality of wavelength bands is spectrally recovered by the second optical phase modulator in order of wavelength to produce a wavelength-stepped laser.

17. The source of claim 1, wherein at least one of the first waveform or the second waveform comprises a chirped sinusoid waveform.

18. The source of claim 1, wherein the first and second waveforms are configured to create a periodic phase modulation for recovery of the plurality of wavelength bands at a frequency of between 100 kHz and 5 MHz.

19. The source of claim 1, wherein the source operates with laser on and laser off periods.

20. The source of claim 19, wherein at least one of the first waveform or the second waveform comprises a chirped sinusoid during the laser on period and a uniform sinusoid waveform during the laser off period.

21. The source of claim 1, wherein the source generates optical pulses with duration (pulsewidths) that are related to the inverse of the linewidth of the Fabry-Perot transmission peaks.

22. A source for providing electromagnetic radiation within a particular spectral range, comprising:
- a ring-shaped optical resonator for circulating a plurality of wavelength bands including:
- a first optical phase modulator,
- a chromatic dispersion device,
- a second optical phase modulator,
- a multi-line spectral domain filter, and
- an optical amplifier;
- a controller coupled to the first optical phase modulator and the second optical phase modulator which is configured to drive the first optical phase modulator with a first waveform and the second optical phase modulator with a second waveform,
- the chromatic dispersion device being configured between the first optical phase modulator and the second optical phase modulator to provide chromatic dispersion so as to subject each of the plurality of wavelength bands to a respective plurality of different time delays,
- the first optical phase modulator and the second optical phase modulator being configured to create spectral broadening by the first optical phase modulator of each of the plurality of wavelength bands and spectral recovery by the second optical phase modulator of a particular wavelength band of the plurality of wavelength bands by modulating a first phase using the first optical phase modulator driven by the first waveform and, after a particular time delay, modulating a second phase using the second optical phase modulator driven by the second waveform comprising an inverse of the first waveform,
  - the particular time delay being determined so as to create spectral recovery for the particular wavelength band of the plurality of wavelength bands,
- the multi-line spectral domain filter being configured to provide multi-line spectral filtering with narrow bandwidths in order to induce power loss for each of the plurality of wavelength bands except for the particular wavelength band,
- the first and second waveforms being configured to create a recovery that has a sufficiently long duration so that each of the plurality of wavelength bands experiences multiple roundtrips within the ring-shaped optical resonator, and
- the first and second waveforms being configured to create a periodic phase modulation for recovery of the plurality of wavelength bands at a frequency that is an integer multiple of a roundtrip frequency of the ring-shaped optical resonator.

23. The source of claim 22, wherein the ring-shaped optical resonator further comprises an optical isolator which is configured to provide optical isolation to make lasing proceed in the ring-shaped optical resonator in one direction.

24. The source of claim 22, wherein at least one of the first optical phase modulator and the second optical phase modulator comprises an electro-optic phase modulator.

25. The source of claim 24, wherein at least one of the first optical phase modulator and the second optical phase modulator comprises a Lithium-Niobate phase modulator.

26. The source of claim 22, wherein the chromatic dispersion device is a dispersive fiber, a chirped fiber Bragg grating, a fiber Bragg grating array, or a reflecting fiber delay line.

27. The source of claim 22, wherein the multi-line spectral domain filter comprises a Fabry-Pérot etalon.

28. The source of claim 22, wherein the optical amplifier is a semiconductor optical amplifier or an erbium-doped fiber amplifier.

29. The source of claim 22, wherein the controller comprises a two-channel arbitrary waveform generator.

30. The source of claim 29, further comprising an RF amplifier to amplify the first and second waveforms.

31. The source of claim 29, wherein the first and second waveforms are generated by performing phase shifting in a frequency domain to improve a precision of the particular time delay.

32. The source of claim 22, wherein the ring-shaped optical resonator further comprises an output coupler which is configured to emit a first output electromagnetic radiation based on the plurality of wavelength bands.

33. The source of claim 22, wherein the particular time delay is adjusted so that each of the plurality of wavelength bands is spectrally recovered by the second optical phase modulator in order of wavelength to produce a wavelength-stepped laser.

34. The source of claim 22, wherein at least one of the first waveform or the second waveform comprises a chirped sinusoid waveform.

35. The source of claim 22, wherein the first and second waveforms are configured to create a periodic phase modulation for recovery of the plurality of wavelength bands at a frequency of between 100 kHz and 5 MHz.

36. The source of claim 22, wherein the source operates with laser on and laser off periods.

37. The source of claim 36, wherein at least one of the first waveform or the second waveform comprises a chirped sinusoid during the laser on period and a uniform sinusoid waveform during the laser off period.

38. The source of claim 22, wherein the source generates optical pulses with duration (pulsewidths) that are related to the inverse of the linewidth of the Fabry-Perot transmission peaks.

* * * * *